United States Patent
Palmer

(10) Patent No.: US 6,529,603 B1
(45) Date of Patent: Mar. 4, 2003

(54) METHOD AND APPARATUS TO REDUCE THE RISK OF OBSERVATION OF A SECRET VALUE USED BY AN INSTRUCTION SEQUENCE

(75) Inventor: David W. Palmer, Portland, OR (US)

(73) Assignee: Convera Corporation, Vienna, VA (US)

( * ) Notice: Subject to any disclaimer, the term of this patent is extended or adjusted under 35 U.S.C. 154(b) by 0 days.

(21) Appl. No.: 09/298,304

(22) Filed: Apr. 23, 1999

(51) Int. Cl.[7] ................................................. H04L 9/00
(52) U.S. Cl. ....................................... 380/286; 380/284
(58) Field of Search ................................. 380/286, 284

(56) References Cited

U.S. PATENT DOCUMENTS

| | | | | |
|---|---|---|---|---|
| 4,953,208 A | * | 8/1990 | Ideno ........................... 380/213 |
| 5,758,137 A | * | 5/1998 | Armstrong et al. .......... 713/502 |
| 6,072,876 A | * | 6/2000 | Obata et al. .................. 380/282 |
| 6,233,339 B1 | * | 5/2001 | Kawano et al. ................ 380/44 |
| 6,427,140 B1 | * | 7/2002 | Ginter et al. .................. 705/53 |
| 6,445,797 B1 | * | 9/2002 | McGough ..................... 380/262 |

* cited by examiner

Primary Examiner—Gilberto Barron
Assistant Examiner—Douglas Meislahn
(74) Attorney, Agent, or Firm—Cooley Godward LLP

(57) ABSTRACT

A method includes determining a recovery value for a portion of a secret value by measuring a first time value to execute an instruction sequence. The recovery value is determined as a function of the first time value and the portion of the secret value. An instruction sequence is adapted to measure a second time value to execute the instruction sequence and to determine the portion of a secret value as a function of the second time value and the recovery value.

15 Claims, 4 Drawing Sheets

METHOD AND APPARATUS TO REDUCE THE RISK OF OBSERVATION OF A SECRET VALUE USED BY AN INSTRUCTION SEQUENCE

BACKGROUND

1. Field

The invention relates to the field of information security, and more particularly, to reducing the risk of the observation of a secret value used by an instruction sequence.

2. Background Information

A data processing device, such as a personal computer, hand-held computer, laptop computer, set top box, and so forth, may execute instruction sequences which operate upon electronic information to make observation and tampering with the information more difficult. Such operations may involve encryption or decryption of the information using secret values (sometimes called "keys"). The protections afforded by such operations may be compromised when an observer gains knowledge of the secret value used to perform the operation. Obtaining this value may enable the observer to alter the effects of the operation and observe or tamper with the information.

For these and other reasons the secret value used in an instruction sequence may be protected from observation. It may be difficult to prevent observation of the secret value by a third party employing a run-time debugger or other code observation tool. Typically the instruction sequence loads the secret value or portions thereof into memory locations or registers. Memory locations and registers are typically viewable using, for example, a run time debugger, making it difficult to prevent observation of these values.

SUMMARY

A method embodiment is described to reduce the risk of observation of a secret value used in an instruction sequence. The method embodiment includes determining a recovery value for a portion of a secret value by measuring a first time value to execute an instruction sequence. The recovery value is determined as a function of the first time value and the portion of the secret value. An instruction sequence is adapted to measure a second time value to execute the instruction sequence. The instruction sequence is further adapted to determine the portion of a secret value as a function of the second time value and the recovery value.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

Figure 1:
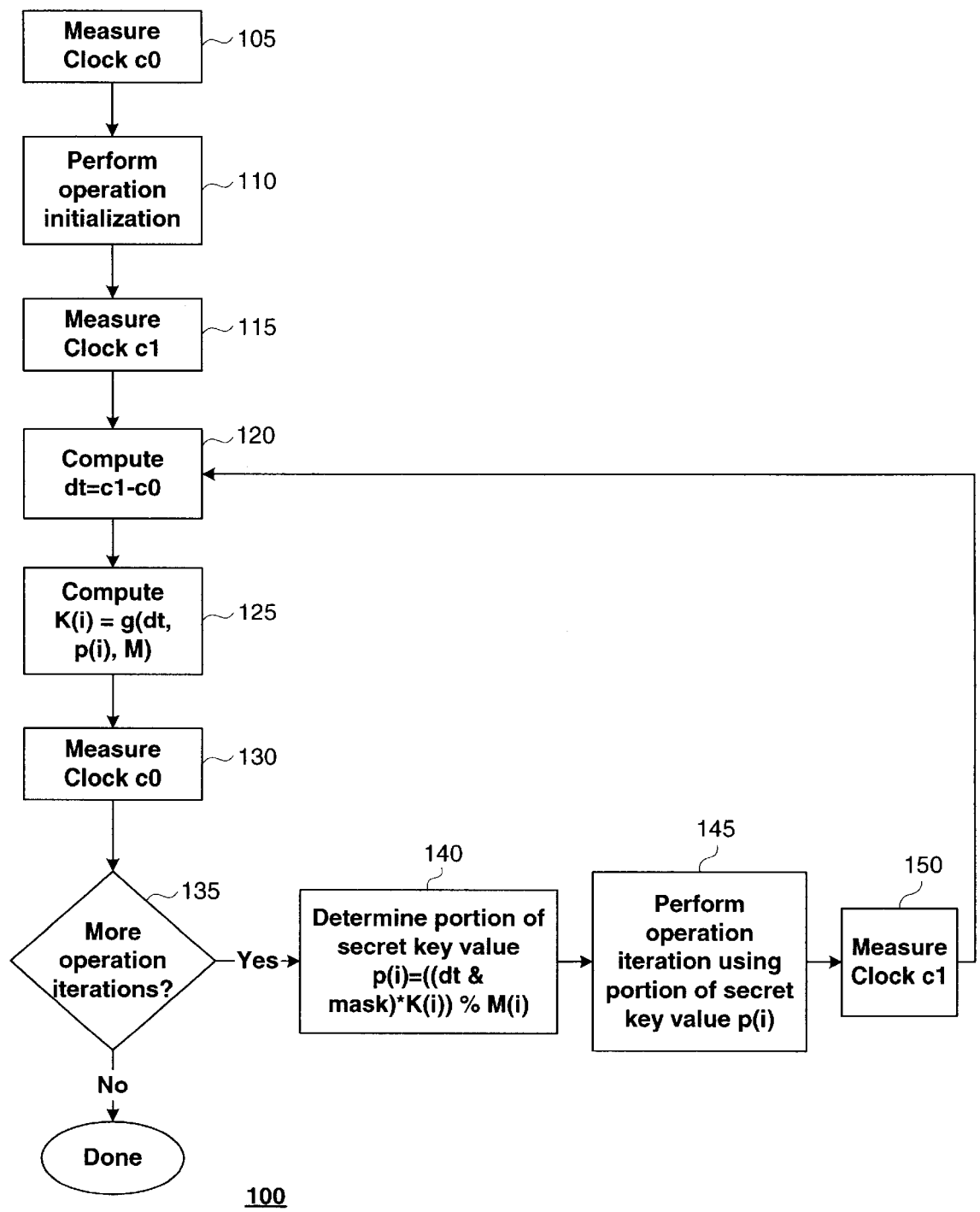
FIG. 1 is a flow chart illustrating an embodiment of a method in accordance with the present invention that may be employed during a profiling stage of an instruction sequence.

The embodiments described herein are merely illustrative, and one skilled in the art will appreciate that numerous modifications can be made which nonetheless fall within the scope of the present invention.

Certain operations may lend themselves to processing in iterations. The RSA Public Key Cryptosystem (1977) process is one example. The RSA process involves two values, a public key and a private key. In manners well known in the art, the private key may be employed to perform secure operations (such as encryptions) on electronic information. The public key may be employed to verify these operations. The private key may be kept secret, and the public key made public. Secure operations may thus be performed without permitting third parties to access or observe the private key value. It is well known in the art that the RSA process may performed iteratively for certain operations, such as encryption. Each iteration of the operation uses a portion of the secret key value.

In accordance with one embodiment of the present invention, a secret value (henceforth referred to as a key) to be used in an instruction sequence may be divided into portions. The instruction sequence may use portions of the key at different times to perform a secure operation. A third party may still attempt to observe the key by observing each key portion to reconstruct the whole key. To reduce the risk of this occurring, the key portions may be derived at run-time. The key portions may be derived using what shall be called a "recovery value". A recovery value for a key portion may be determined by adapting the instruction sequence (such as by adding, modifying, or deleting instructions) to measure a time value to execute a portion of the instruction sequence. The recovery value may be determined as a function of the time value and the key portion. The recovery value for a key portion may be determined, for example, while profiling the instruction sequence prior to releasing it to distribution. Once the instruction sequence is distributed, the instructions may be executed. The sequence may be adapted, prior to distribution, to measure at execution time the time to execute each portion of the instruction sequence. The instruction portions to measure at execution time are the same instruction portions used to determine the recovery values at profiling time. Each key portion may be derived as a function of the time value and the recovery value.

Incorporating a time value into the derivation of the key portion may make it more difficult for an observer to obtain the correct values of the key portions. An observer trying to ascertain the secret value (for example, by stepping through the instruction sequence with a debugger), may disrupt the normal execution time of the instruction sequence. The result may be measured time values to execute the instructions, which may vary substantially from the time value used to generate the recovery values. As a result, it may not be possible for an observer to accurately recover the key portions, maintaining the continued secrecy of the key as a whole.

FIG. 1 shows an embodiment 100 of a method in accordance with the present invention. The method may be carried out during profiling of an instruction sequence. Those skilled in the art will appreciate that profiling an instruction sequence typically comprises an execution of the instruction sequence under conditions by which performance and other execution metrics may be gauged. Profiling may be carried out prior to distributing the instruction sequence to its intended users. Those skilled in the art will appreciate that there are many ways to package an instruction sequence for distribution, including as a program, a module, a statically linkable library, an "applet", and/or a dynamically linkable library, to name just a few of the well-known possibilities. The invention is not limited to any particular technique for packaging or distributing the instruction sequence.

In this description, references will be made to "profiling" versus "execution" of the instruction sequence. Profiling shall refer to execution of the sequence during profiling, as described above. Execution shall refer to execution of the sequence after the sequence is distributed to its intended users.

Referring to FIG. 1, a clock value c0 is measured at 105 and an initialization sequence is performed at 110. The clock value c0 may represent the elapsed time from when a processor executing the sequence is first started. A clock value c1 is measured at 115. By subtracting the two measured clock values at 120 an elapsed time difference representing the time to execute the initialization sequence may be determined. The number of elapsed clock cycles may be determined in numerous ways, for example, using the RDTSC instruction on the Intel Pentium® processor or compatible processor which returns the absolute number of elapsed cycles since the processor was started. Of course, the invention is not limited to Pentium processor or compatible processors. The elapsed time difference may vary according to the architecture of the processor (pipelined, superscalar, etc.) and numerous other factors that may affect execution time of instruction sequences. Examples of such factors include traffic load on the data bus of the processor executing the instructions (which may delay the completion of LOAD and STORE instructions) and the contents and organization of the processor's cache memory.

In other words, two samples c0 and c1 of the elapsed cycles may be taken, one before and one after a portion of the sequence of instructions is executed by the processor. A difference $dt=c1-c0$ between these samples is determined, and this difference may be used to produce a constant from which a key portion may be derived. The method of determining this constant, which shall be referred to as a "recovery value", is further described below.

A recovery value $K(i)$ may be determined at 125 as a function g of the time difference dt and a key portion $p(i)$ to use in a portion of the instruction sequence. The symbol i refers to an index representing the iteration to perform (i=0,1,2, etc.). In equation form, $K(i)=g(dt, p(i))$. The recovery value $K(i)$ may in some embodiments be a function of additional parameters as well, for example a value M. For reasons well known in the art, M may be chosen as a prime number exceeding the range of values $p(i)$ (for reasons described below). It is well known in the art that choosing prime numbers in equations involving modulo operations may increase the difficulty of reverse engineering certain parameters of the equation from the results of the equation.

Thus, in one embodiment, the recovery value $K(i)$ for a key portion $p(i)$ may be determined as $$K(i)=(p(i)*inverse(dt))\%M$$

As previously noted, the value M should exceed the range of possible values for $p(i)$. Those skilled in the art will appreciate that this ensures that the modulus may be correctly determined over all values of $p(i)$. In one embodiment, the value M may vary for each $K(i)$ and may thus be represented as $M(i)$ in the above equations.

Those skilled in the art will recognize this as the well known "extended greatest common divisor" process for the function $p(i)=(dt*K(i))\%M$. This function will be used to recover the key portions $p(i)$ as further described below.

Using this approach the key need not be stored within the instruction sequence, or externally to it, where it may be discovered by an observer. Instead, the values $K(i)$ and $M(i)$ for each key portion may be stored and made available during execution of the instruction sequence. These values may be applied at execution time to derive (recover) the key portions $p(i)$. Time difference values dt are measured during execution of the sequence. If these dt values are similar in value to the ones applied to produce the values $K(i)$, the key portions may be correctly recovered. Otherwise, the key portions may not be correctly recovered.

The method is then repeated to determine recovery values for other iterations of the instruction sequence. The clock value c0 may be measured again at 130. If at 135 it is determined that there are more iterations of the operation to perform, the key portion may be recovered at 140. As previously described, in one embodiment $K(i)$ is computed such that $p(i)$ may be recovered using the function $$p(i)=((dt \ \& \ mask)*K(i))\%M(i)$$

In this equation, dt represents the time difference value determined at 120, $p(i)$ is the key portion to recover, "&" is a logical bitwise AND operation, $K(i)$ is the recovery value corresponding to $p(i)$, and "%" is a modulo operation. As previously described, $M(i)$ is a value chosen to be a prime number exceeding the possible range of values of $p(i)$.

The mask may be employed to remove precision (lower order bits) from the time difference value dt so that the probability of matching the time difference value measured during profiling with the time difference value measured during execution of the instruction sequence is improved. For example, differences in the cache contents of the processor used to execute the instruction sequence during profiling and during execution may cause variations in the measured time difference values for the same instruction sequence. Loading on the processor data bus or other operational variations between different processors may also provide a source of variation in the time difference values. However, hardware or software interrupts during execution of the instruction sequence may provide large variations in the time difference value. Masking may not compensate for these large variations.

$M(i)$ may be selected as a prime number with a value larger than the possible range of values for $p(i)$. Thus, during profiling, the following values may be predetermined for each iteration of the operation: $p(i)$, $M(i)$, and the mask. The time difference value dt may be measured during profiling. The $K(i)$ value may be computed during profiling. In other words, the time difference value is measured and not stored, and $p(i)$ is derived and not stored. Thus it may not be possible to observe these values while the instruction sequence is not executing. For example, a static disassembly listing of the instruction sequence would not reveal these values.

In one embodiment, $K(i)$, $M(i)$, and dt may vary for each key portion applied by the instruction sequence. In another embodiment, the mask value may be the same for each key portion. In one embodiment the key comprises 512 bits, divided into 64 contiguous 8 bit portions $p(i)$. In this embodiment $M(i)$ may have small prime values such as 23 or 31, depending upon the possible range of values of $p(i)$. In one embodiment the values of $K(i)$, $M(i)$, dt, the mask, and $p(i)$ are represented in memory using 32 bit values. Of course, the invention is in no way limited to these particular representations of the values.

The values K(i) and M(i) may be associated with p(i) for each iteration of the operation so that p(i) may be later recovered during execution. The iteration of the instruction sequence using p(i) may be executed at 145. The clock may again be measured at 150 and control returns to 120 where the time difference value dt is again computed. The time difference value represents the approximate elapsed time to perform the previous iteration of the operation using key portion p(i). If additional iterations of the operations are to be performed, a time difference value representing the time to execute the prior iteration of the instruction sequence may be applied to obtain K(i) for the next key portion p(i) to be used by the next iteration of the operation.

Figure 2:
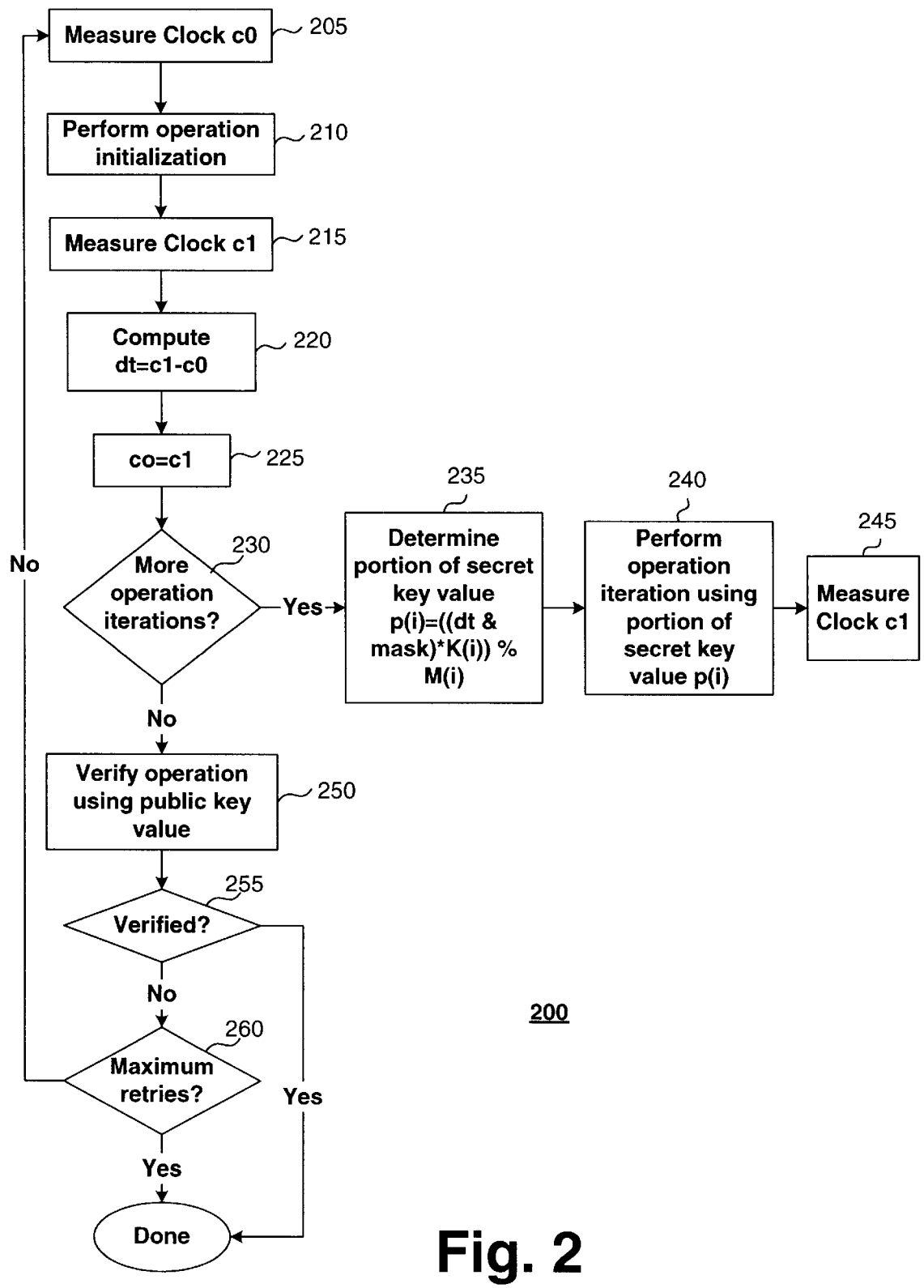
FIG. 2 is a flow chart illustrating an embodiment of a method in accordance with the present invention that may be employed following distribution of an instruction sequence.

FIG. 2 shows an embodiment 200 of a method in accordance with the present invention applied during execution of the instruction sequence. After distribution, the sequence may be executed on a processor in an environment in which there exists some risk of observation of the key by an unauthorized party. For example, a computer "hacker" may execute a computer program comprising the instruction sequence under control of a debugger. The hacker may apply the debugger to view and modify instructions and data values (including the key) used in the sequence.

During execution, a clock measurement c0 may be taken at 205. The initial instruction sequence may be executed at 210 and another clock measurement c1 taken at 215. A time difference value dt may be determined at 220. The first clock measurement is set to the second clock measurement at 225. This may be done as a programming convenience for additional operation iterations, if any, to simplify computation of the time difference value dt at 220. It is determined at 230 if more operation iterations are to be performed. If so the instruction sequence may recover a key portion at 235. The key portion may be recovered by performing the operation p(i)=f(dt, K(i), M(i)), where K(i) is the recovery value determined during profiling for the key portion to recover and M(i) is the modulus value applied to the determination of K(i) during profiling. In one embodiment, p(i) is recovered using the function $$p(i)=((dt \ \& \ mask)*K(i))\%M(i)$$

The operation iteration using the key portion may be performed at 240. Another clock measurement c1 may be taken at 245. The method returns to 220 to compute a next time difference dt for the next iteration of the operation (if there is one). In this manner, for each key portion used by the instruction sequence, a time difference value dt is computed and a recovery value K(i) employed to recover the key portion for the iteration.

As previously described, some embodiments may apply a mask value to the time difference value to remove precision. The time difference value measured for an iteration of the instruction sequence may not fall within a tolerance (specified by the mask) of the time difference value measured for that iteration during profiling. In this situation, the key portion may not be correctly recovered. However, the process of computing key portions may continue until a complete key has been recovered and applied to perform a secure operation. One such secure operation is the determination of a digital signature on electronic information (which may comprise instructions, data, or both). As previously described, using certain processs a key may be recovered in iterations and applied in portions to a secure operation such as encryption. The RSA Public Key Cryptosystem (1977) is as example of an process which may be applied in iterations. The RSA process may lend itself to performing encryption in iterations, using a key portion per iteration. The encryption operation may be determined in iterations using a single portion of the key for each portion, with no memory of prior or next portions of the key employed to perform a particular iteration.

Encryption operations, such as a digital signature operations, are merely one example of computing operations which may benefit from embodiments of the present invention. Any operation involving a value in an instruction sequence to be kept secret from an observer may benefit from employing an embodiment of the present invention.

In one embodiment, a verification of the results of the secure operation may be performed at 250. This may be done in order to determine whether the key was properly recovered.

The result of verification may be evaluated at 255. In one embodiment employing RSA encryption using a private key, the results may be verified by applying the corresponding public key. Various techniques for verifying operations involving secret values are well known in the art. For example, a digital signature may be verified by applying the corresponding public key to decrypt the signature into a hash value. A new hash value is determined for the information to which the signature was applied. The new hash is compared with the decrypted hash. If the values match, the private key was properly recovered and the operation is verified. Otherwise, if the hash values do not match, it may be an indication that time difference value for one or more of the recovered key portions did not correspond to the time difference value measured during profiling of the instruction sequence. The measurement of time difference values during the execution stage which do not correspond to those measured during the profiling stage may indicate the presence of an observer interfering with normal program execution. For example, such results may indicate the presence of a computer hacker employing a debugger to set break points in the instruction sequence. Such results may also indicate the interruption of the instruction sequence by hardware devices or software sequences during execution. For example, a mouse device may cause interruption of the instruction sequence between two clock measurement points. This may cause the processor to branch to an interrupt service routine, substantially increasing the time difference value measured for the instruction sequence during execution. A result may be the failure to recover the key portion to use for the instruction sequence for one or more iterations.

The instruction sequence may attempt to repeat the operation, including recovery of the key portions. This may be done to compensate for the possible occurrence of interrupts or other execution stage environmental factors. As previously described, such factors may cause substantial variation in the measured time difference value from the values measured during profiling. The instruction sequence may determine at 260 whether a number of predetermined retries of the operation has been attempted. Failure to verify the operation after a predetermined number of retries may indicate the presence of an unauthorized observer who is attempting to ascertain the secret value.

Figure 3:
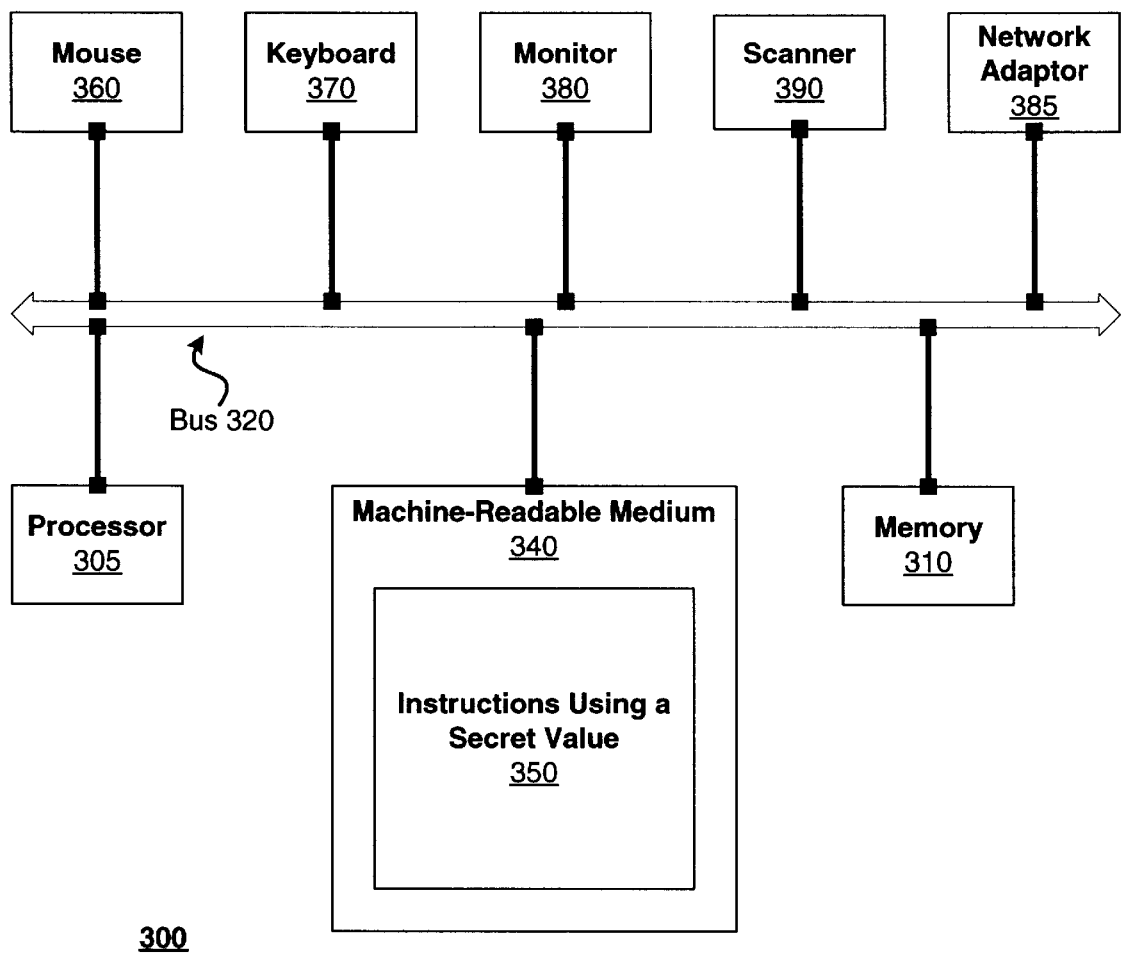
FIG. 3 is a schematic diagram illustrating an embodiment of an apparatus in accordance with the present invention.

FIG. 3 shows an embodiment of an apparatus in accordance with the present invention. Referring now to FIG. 3, embodiment 300 comprises a processor 305 to execute instructions supplied from a bus 320. The executed instructions are stored in a memory 310 from which they are supplied to the processor 305 by the bus 320 for execution. The processor 305 may be implemented using any semiconductor fabrication technology and may execute any instruction set including, but not limited to, instruction sets supported by an Intel Corporation Pentium® processor or compatible processor. The bus 320 may be implemented using technologies for propagating signals including, but not limited to, electronic and optical conductors. The memory may include random access memory (RAM), read-only memory (ROM), or any other form of memory capable of storing instructions which may then be supplied to the processor 305 by the bus 320 for execution. Embodiment 300 may include a machine-readable storage medium 340 to store sequences of instructions which may be loaded into volatile memory 310 from which they may be supplied to processor 305 for execution. The machine-readable storage medium 340 may include, but is not limited to, a hard drive, a floppy drive, and a CD-ROM or other optical disk.

One skilled in the art will appreciate that in "diskless" devices without mass storage mediums, the machine-readable storage medium 340 may be omitted from the embodiment 300. Instructions, including instructions using a secret value 350, may then be stored in RAM, ROM, or other memory from which instructions may be directly accessed over the bus 320 by the processor 305 for execution.

To perform signal input/output, embodiment 300 may comprise a mouse 360, a keyboard 370, a display 380, and a scanner 390, each coupled to the bus 320 for transmitting data so that it may be easily accessed or manipulated by a user. The embodiment 300 may further include a network adapter 385 to couple the embodiment 300 to a network. Of course, the invention is not limited in scope to this particular embodiment.

In accordance with the present invention, embodiment 300 may comprise instructions using a secret value 350 stored on the machine-readable storage medium 340. The instructions may include sequences of instructions for performing the method embodiment illustrated in FIG. 2, for example. These instruction sequences are further illustrated in FIG. 4. Of course, the invention is not limited in scope to this particular embodiment.

Figure 4:
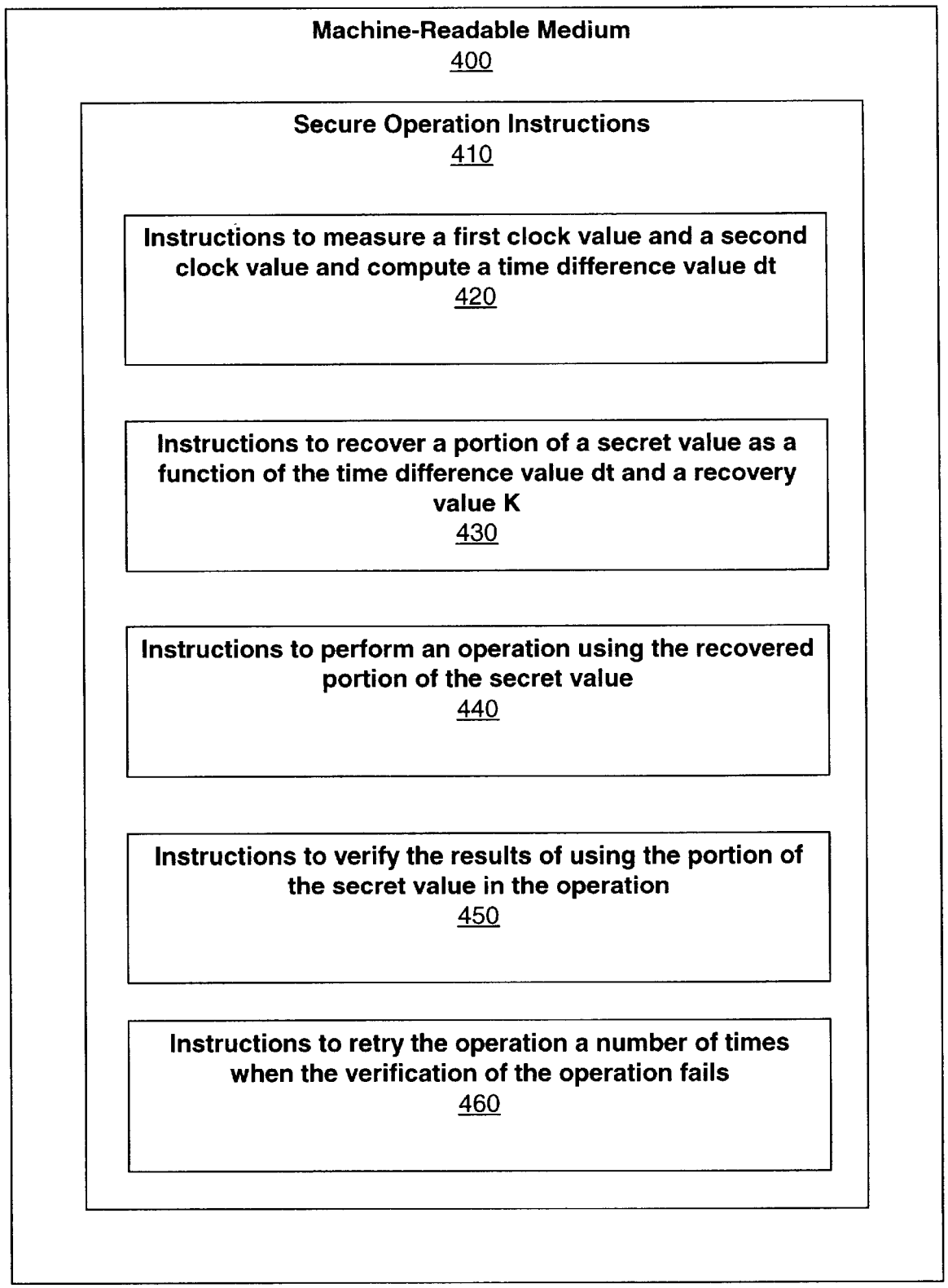
FIG. 4 is a schematic diagram illustrating an embodiment of a machine-readable medium in accordance with the present invention.

FIG. 4 is a schematic diagram illustrating an embodiment of a machine-readable medium 400 comprising an embodiment of a sequence of instructions 410 using a secret value in accordance with the present invention. Referring now to FIG. 4, the machine-readable storage medium 400 may comprise RAM, ROM, a floppy disk, and hard disk, a CD ROM, or any other memory capable of storing sequences of instructions which may be executed by a data processing device such as, for example, the device embodiment illustrated in FIG. 3. In this particular embodiment, the sequences of instructions may comprise sequences of instructions to carry out, for example, the method embodiment of FIG. 2, including but not limited to: instructions 420 to measure a first clock value and a second clock value and compute a time difference value dt; instructions 430 to recover a portion of a secret value as a function of the time difference value dt and a recovery value K, the recovery value K determined during a profiling stage of the instruction sequence 410; instructions 440 to perform an operation using the recovered portion of the secret value; instructions 450 to verify the results of using the portion of the secret value in the operation; and instructions 460 to retry the operation a number of times when the verification of the operation fails. Of course, one skilled in the art will appreciate that FIG. 4 does not imply any particular "groupings" or sequencing of instructions, and is merely intended to indicate the presence of instructions on the medium capable of causing a processor to perform particular operations.

Of course, the invention is not limited in scope to this particular embodiment. For example, alternate embodiments could include additional sequences of instructions for performing other functions different from or supplementing the instructions 410 using the secret value.

Various manners of producing the machine-readable storage medium 400 storing sequences of instructions, such as binary post-processing instructions 410, are well-known in the art and to elaborate in detail would merely obscure the description of the present invention.

In summary, an advantageous method and apparatus to reduce the risk of observation of a secret value used by an instruction sequence has been described. The instruction sequence may use one portion of the secret value at a time to perform an operation employing the secret value. For each portion of the secret value, a recovery value may be determined. This recovery value may be determined by measuring a time value to execute each iteration of the instruction sequence. The recovery value may be determined as a function of the time value and the portion of the secret value. The portion of the secret value to use may be recovered by measuring a time values to execute the iteration of the instruction sequence. The portion of the secret value may be determined as a function of the time value measured during execution and the recovery value.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:
   determining a recovery value for a portion of a secret value by measuring a first time value to execute an instruction sequence, the recovery value determined as a function of the first time value and the portion of the secret value; and
   adapting the instruction sequence to measure a second time value to execute the instruction sequence and to determine the portion of a secret value as a function of the second time value and the recovery value.

2. The method of claim 1 in which the secret value comprises a private key corresponding to a public key.

3. The method of claim 1 in which determining the recovery value further comprises:
   applying a mask value to the first time value.

4. The method of claim 3 in which adapting the instruction sequence further comprises:
   adapting the instruction to apply the mask value to the second time value.

5. The method of claim 2 in which adapting the instruction sequence further comprises:
   adapting the instruction sequence to verify recovery of the private key.

6. A device comprising:
   a processor;
   a machine-readable storage medium coupled to the processor by way of a bus, the storage medium storing a sequence of instructions which, when executed by the processor, cause the data processing device to
   recover a portion of a secret value used by the sequence of instructions by measuring a first time value to execute the sequence of instructions, the portion of the secret value determined as a function of the first time value and a recovery value, the recovery value being a function of a second time value measured during a prior execution of the sequence of instructions and the portion of the secret value.

7. The device of claim 6 in which the secret value to hide from observation comprises a private key corresponding to a public key.

8. The device of claim 6 in which the sequence of instructions, when executed by the processor, further cause the device to:

apply a mask value to the second time value.

9. The device of claim 8 in which the mask value is also applied to the first time value.

10. The device of claim 7 in which the sequence of instructions, when executed by the processor, further cause the device to:

verify recovery of the portion of the private key using the public key.

11. A machine-readable medium having stored thereon a sequence of instructions which, when executed by a data processing device, cause the data processing device to:

recover a portion of a secret value by measuring a first time value to execute the sequence of instructions, the portion of the secret value determined as a function of a first time value, measured during execution of the instruction sequence, and a recovery value, the recovery value being a function of a second time value measured during a prior execution of the sequence of instructions and the portion of the secret value.

12. The machine-readable medium of claim 11 in which the secret value to hide from observation comprises a secret key corresponding to a public key.

13. The machine-readable medium of claim 12 in which the sequence of instructions, when executed by the processor, further cause the device to:

apply a mask value to the second time value.

14. The machine-readable medium of claim 13 in which the mask value is also applied to the first time value.

15. The machine-readable medium of claim 12 in which the sequence of instructions, when executed by the processor, further cause the device to:

verify recovery of the portion of the secret key using the public key.

* * * * *